United States Patent [19]
Tokioka et al.

[11] Patent Number: 5,714,698
[45] Date of Patent: Feb. 3, 1998

[54] GESTURE INPUT METHOD AND APPARATUS

[75] Inventors: Masaki Tokioka, Fujisawa; Atsushi Tanaka, Kawasaki; Yuichiro Yoshimura, Kamakura; Ryozo Yanagisawa, Inzaimachi; Katsuyuki Kobayashi, Yokohama; Hajime Sato, Yokohama, all of Japan

[73] Assignee: Canon Kabushiki Kaisha, Tokyo, Japan

[21] Appl. No.: 837,128

[22] Filed: Apr. 14, 1997

Related U.S. Application Data

[63] Continuation of Ser. No. 382,805, Feb. 2, 1995, abandoned.

[30] Foreign Application Priority Data

Feb. 3, 1994 [JP] Japan ................... 6-011590

[51] Int. Cl.$^6$ .................. G01P 15/08; G01P 3/441; G01P 3/56
[52] U.S. Cl. ................... 73/865.4; 73/510
[58] Field of Search ................. 73/865.4, 865.7, 73/504.02, 504.03, 510; 340/573

[56] References Cited

U.S. PATENT DOCUMENTS

| | | | |
|---|---|---|---|
| 3,200,814 | 8/1965 | Taylor et al. | 73/865.4 X |
| 4,414,537 | 11/1983 | Grimes | 340/365 |
| 4,787,051 | 11/1988 | Olson | 364/518 |
| 4,980,519 | 12/1990 | Mathews | 178/19 |
| 5,288,938 | 2/1994 | Wheaton | 84/600 |
| 5,319,747 | 6/1994 | Gerrissen et al. | 395/155 |
| 5,335,557 | 8/1994 | Yasutake | 73/862.043 |

FOREIGN PATENT DOCUMENTS

| | | |
|---|---|---|
| 211984 | 3/1987 | European Pat. Off. . |
| 0516862A1 | 12/1992 | European Pat. Off. . |
| 262921 | 12/1988 | Germany ............ 73/865.4 |
| 113334 | 5/1991 | Japan ............ 73/865.7 |

OTHER PUBLICATIONS

*Patent Abstracts of Japan* Grp. P1727, vol. 18, No. 214 Abs pub. date Apr. 15, 1994 abstract of JP (6-12493) published Jan. 21, 1994 "Gesture Recognizing Method and User Interface Method".

*Patent Abstracts of Japan* Grp. P1823, vol. 18 No. 584 Abs pub. date Nov. 8, 1994 abstract of JP (6-214982) published Aug. 5, 1994 "Document Processor with Gesture Editing Function Data".

*Primary Examiner*—Thomas P. Noland
*Attorney, Agent, or Firm*—Fitzpatrick, Cella, Harper & Scinto

[57] ABSTRACT

A gesture input apparatus comprises: a plurality of multiaxis angular velocity sensors or multiaxis acceleration sensors respectively for detecting multiaxis angular velocities or multiaxis accelerations; a difference sampling circuit for outputting the difference between one of outputs from the sensors, as a reference value, and outputs from the other sensors; a gesture dictionary for pre-storing sample values of feature relative value outputs; an arithmetic operation controller for recognizing gesture, by comparing an output value from the difference sampling circuit with a value within the gesture dictionary, based on output indicative of change in elapse of time, from said difference sampling circuit, as one set of data; and a distance sensor for detecting the relative distance between a fixed member and a movable member by using sound waves or light.

9 Claims, 7 Drawing Sheets

| GESTURE | | VERTICAL AXIAL DIFFERENCE OUTPUT | | HORIZONTAL AXIAL DIFFERENCE OUTPUT | | COMMAND | |
|---|---|---|---|---|---|---|---|
| | | a-b OUTPUT | a-c OUTPUT | a-b OUTPUT | a-c OUTPUT | | |
| WITHDRAW ARM | (HAND : FORNT) | +d+d+d+d | -d-d-d-d | 0 0 0 0 | 0 0 0 0 | | ZOOM IN |
| FORWARD ARM | (HAND : FORNT) | -d-d-d-d | -d-d-d-d | 0 0 0 0 | 0 0 0 0 | | ZOOM OUT |
| WAVE ARM | (HAND :PARALLEL) | 0 0 0 0 | 0 0 0 0 | ±d±d±d±d | ±d±d±d±d | WINDOW MANAGEMENT | MOVE |
| TURN ARM | | +d 0 -d 0 | +d 0 -d 0 | 0 +d 0 -d | 0 +d 0 -d | | CLOSE |
| TURN HAND | (ONCE) | 0 0 0 0 | +d 0 -d 0 | 0 0 0 0 | 0 +d 0 -d | | DRAG (DESIGNATION) |
| | (CONTINUOUSLY) | 0 0 0 0 | +d 0 -d 0 | 0 0 0 0 | 0 +d 0 -d | ICON OPERATION | OPEN |
| WAVE HAND | (FAST AND STRONG) | 0 0 0 0 | ±d 0 0 0 | 0 0 0 | 0 0 0 | | CLICK (EXECUTION) |
| | (SLOWLY AND GREATLY) | 0 0 0 0 | ±d±d±d 0 | 0 0 0 | 0 0 0 | | SCROLL |

* d : INTEGER (4 BITS)

FIG. 7

GESTURE INPUT METHOD AND APPARATUS

This application is a continuation of application Ser. No. 08/382,805 filed Feb. 2, 1995 now abandoned.

BACKGROUND OF THE INVENTION

The present invention relates to a human interface for electronic information devices and, more particularly to a gesture input method and apparatus for inputting the motion of fingers, hands and arms.

Human interface of conventional electronic information devices has been developed with use of keyboard-input, pen-input, image and audio-input and the like using various media. As a future human interface, gesture-input is now being proposed. As a means for human communication, gesture is the next most important to language, and gesture-input is expected to be a user-friendly man-machine interface.

Gesture-input devices include a three-dimensional coordinate input device and a Power glove (trade name of a family-computer tool) having a strain gauge at each finger. In addition, a device which inputs, manual sign language as images and recognizes the input image data has been introduced.

However, the conventional gesture-input devices have the following problems:

(1) A three-dimensional coordinate input device using ultrasonic waves can hardly input coordinates of a plurality of the points simultaneously because of preventing interference of sound waves. Usually, the device inputs, e.g., the movement of only the whole arm. Further, as the transmission speed of the sound wave is slow, the arrival of the sound wave must be awaited for measuring a length. This disturbs high-speed sampling. It can be considered that the input technique of this device is not suitable for faithful input of human gesture.

(2) A Power glove utilizing the strain gauge detects bends of joints, thus the glove can recognize gesture to a certain degree. However, the glove cannot detect the bend of a joint exactly. That is, even if the glove is deformed following the motions of fingers and hand, there are limitations in close adhesion, in degree of elasticity/flexibility, and further, in resolution.

(3) The image processing technique allows an input device itself physically free, to input since the input can be made by directing a camera toward an object. As processing speed increases, real-time input becomes possible. However, the data amount of image data to be inputted is large, which requires substantial calculation and processing time. This enlarges the device size and increases the product costs.

SUMMARY OF THE INVENTION

The present invention has as its object to provide a gesture input method and apparatus which eliminates the above drawbacks of the conventional input methods and enables simple, correct and high-precision gesture input. Further, the present invention has another object to provide a gesture input method and apparatus which attains downsizing of the apparatus and high-speed operation due to the small amount of gesture input data.

To solve the above problems, a gesture input apparatus according to the present invention comprises: a plurality of multiaxis angular velocity detection means or multiaxis acceleration detection means respectively for detecting multiaxis angular velocities or multiaxis accelerations; relative value output means for outputting relative values for every axes between one of the outputs from the multiaxis angular velocity detection means or multiaxis acceleration detection means, as a reference value, and the other outputs from said multiaxis angular velocity detection means or multiaxis acceleration detection means; and gesture recognition means for recognizing gesture by regarding data representing a change of output from said relative value output means in an elapse of time as one set of data. Thus, a small-sized, high-speed and exact gesture input apparatus can be realized.

The multiaxis angular velocity detection means or multiaxis acceleration detection means is two-axis angular velocity detection means or two-axis acceleration detection means. The gesture recognition means has gesture dictionary means for pre-storing sample values characteristic of relative value outputs, and performs gesture recognition by comparing the output value from the relative value output means with the value within the gesture dictionary means. The gesture input apparatus may further comprise, in addition to the above detection means, measurement means for detecting a relative distance between a fixed member and a movable member, by using sound waves or light, to input the whole movement of an object of gesture.

Further, a gesture input method of the present invention is a gesture input method for inputting human action in the form of coded data, comprising the steps of: inputting angular velocities or accelerations from a plurality of multiaxis angular velocity detection means or multiaxis acceleration detection means respectively for detecting multiaxis angular velocities or multiaxis accelerations; and converting human action into code data, based on relative values for every axes one of outputs from the multiaxis angular velocity detection means or multiaxis acceleration detection means, as a reference value, and the other outputs from the multiaxis angular velocity detection means or multiaxis acceleration detection means.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENT(S)

Preferred embodiments of the present invention will be described in detail in accordance with the accompanying drawings.

[First Embodiment]

Figure 1:
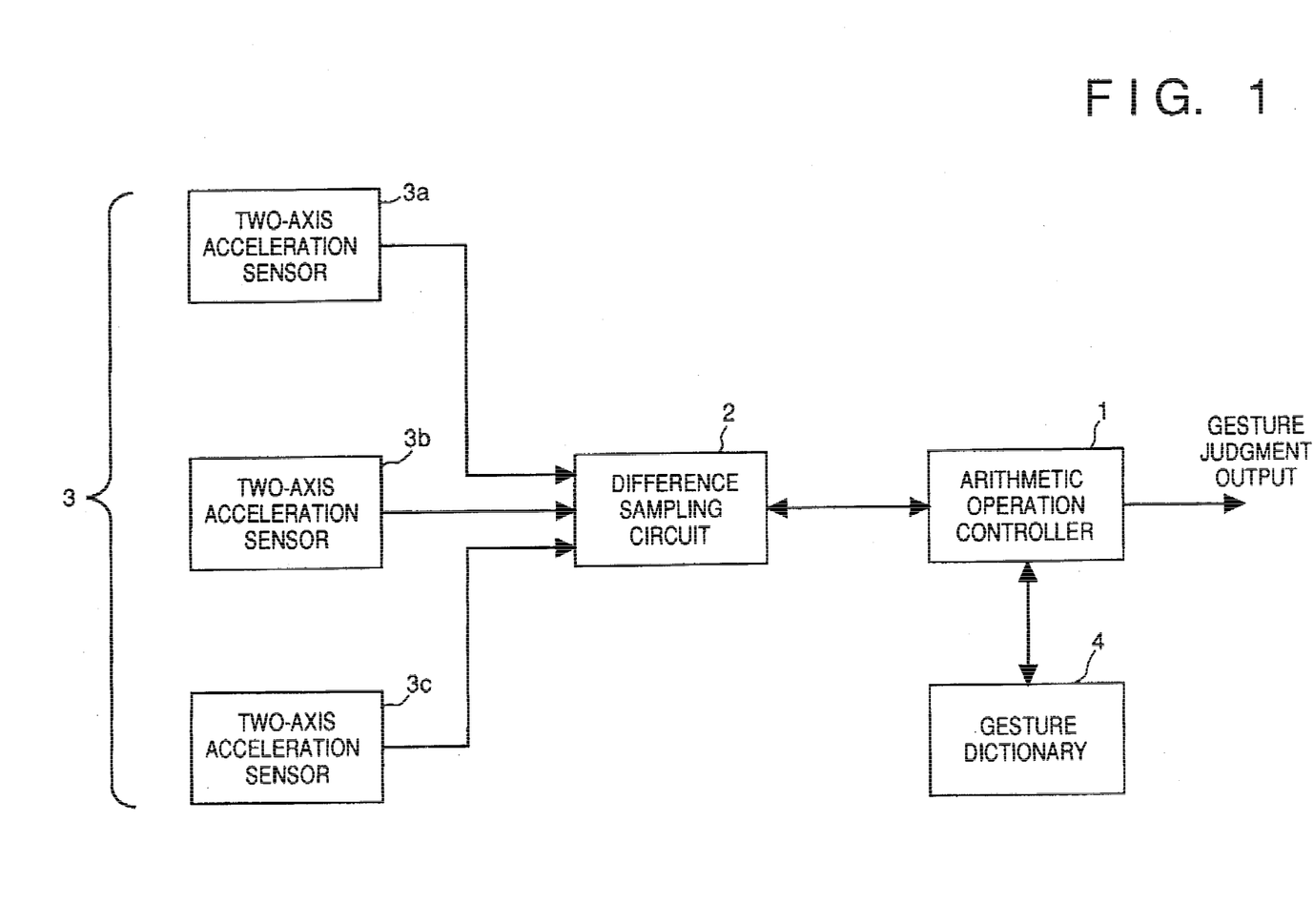
FIG. 1 is a block diagram showing the construction of a gesture input apparatus according to a first embodiment of the present invention.

FIG. 1 shows the schematic construction of a gesture input apparatus according to an embodiment of the present invention.

An arithmetic operation controller 1 inputs coded gesture data, judges the type of gesture, and executes processing assigned for the gesture. A difference sampling circuit 2 samples the difference between an output value from one of two-axis acceleration sensors 3 (e.g., a sensor 3a) as a reference sensor and an output value from another one of the sensors 3 (3b or 3c) within prejudged period, converts the sampled difference value into coded gesture data and outputs the data. Note that the prejudged period may be set as time from a point where the arithmetic operation controller 1 starts to a point where the arithmetic operation controller 1 stops or as a range which exceeds a threshold value of output values from the two-axis acceleration sensors 3, to be outputted to the difference sampling circuit 2. Otherwise, the prejudged period may be set by switching means which generates a start signal and a stop signal. It is well-known that the two-axis acceleration sensors may comprise the combination of one-axis acceleration sensors.

For judgment of gesture by the arithmetic operation controller 1, reference gesture coded data as reference data are pre-stored in a gesture dictionary 4, and output data from the difference sampling circuit 2 and the data stored in the gesture dictionary 4 are compared. This enables more accurate and flexible gesture judgment. Note that the arithmetic operation controller 1 comprises, e.g., a CPU for arithmetic operation control, a ROM for storing CPU control procedures and values such as thresholds and CPU start time and CPU stop time, and a RAM, as an auxiliary storage for storing input data and for comparison and judgment. So far as appropriately-coded gesture data is inputted, the reference data in the gesture dictionary 4 and the procedures for the comparison and judgment by the arithmetic operation controller 1 are easily prepared, therefore, the detailed explanation of these operations will be omitted.

The following are examples of the conversion of the outputs from the two-axis acceleration sensors 3 into code data by the difference sampling circuit 2, i.e., a method for processing difference output value (extraction and selection method).

Example 1: selection of a sensor difference output value

Example 2: selection of the central frequency component of a sensor difference output value Example 3: selection of a range where a sensor difference output value exceeds a threshold value = the width of predetermined period (time)

Example 4: selection of the integral value among the sensor difference output values, or the twice-integral value among the sensor difference output values Example 5: selection of the maximum value among sensor difference output values, the integral value among sensor difference output values, or the twice-integral value among the sensor difference output values The difference sampling circuit 2 performs a part or all of the above processings, and converts the outputs from the two-axis acceleration sensors 3 into output values in the form of coded digital data. In this embodiment, two-axis difference outputs from the combination of two-axis acceleration sensors 3a and 3b and from the combination of the two-axis acceleration sensors 3a and 3c, i.e., four output values are outputted to the arithmetic operation controller 1.

Figure 2:
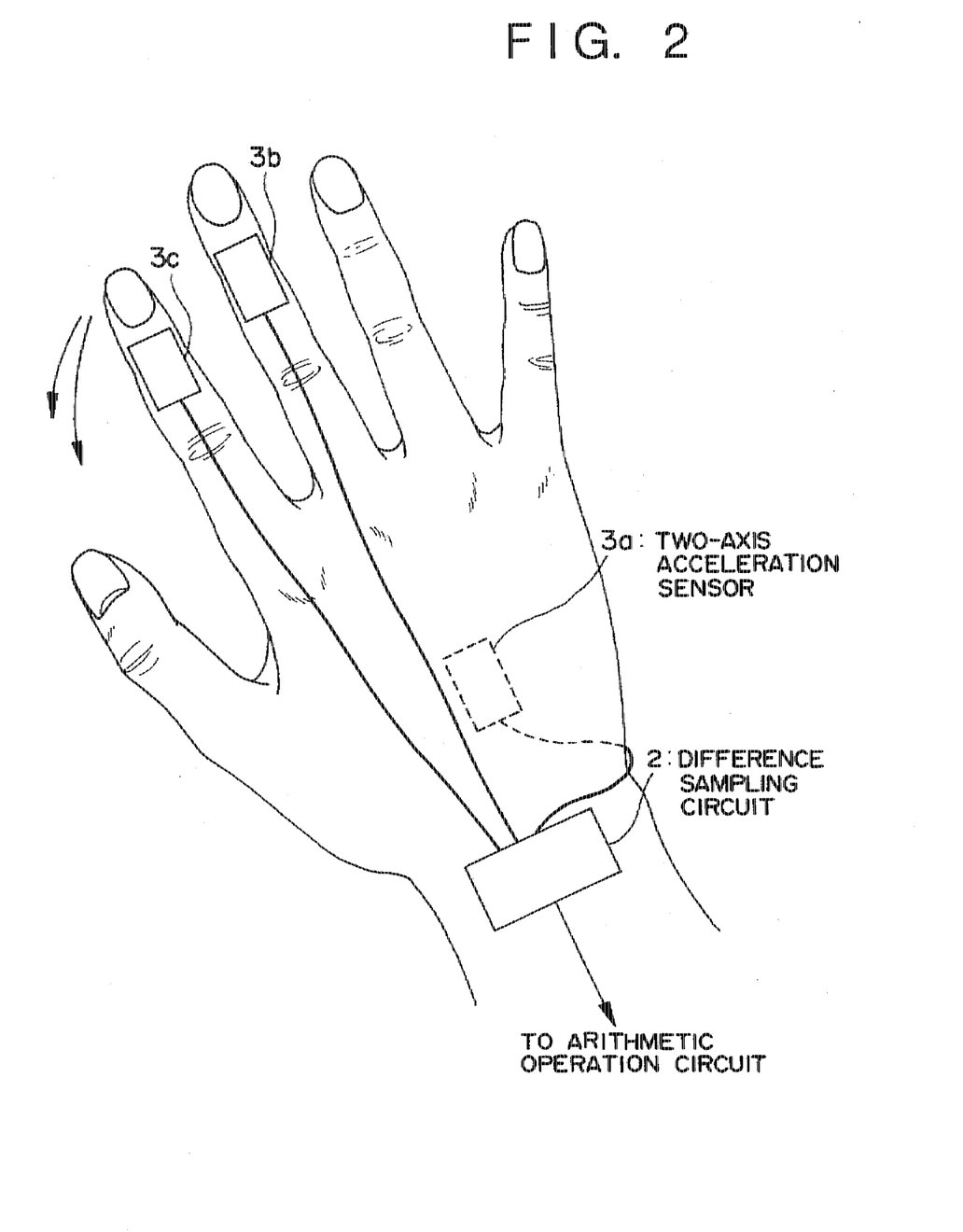
FIG. 2 is an example of use of the gesture input apparatus of the first embodiment.

FIG. 2 shows an example where the present embodiment is actually applied to an interface of a computer.

The two-axis acceleration sensor 3a as the reference sensor is attached to a hand, and the other two sensors 3c and 3b are attached to the index finger and the middle finger respectively. In the two-axis acceleration sensors 3, one axis is arranged to detect the acceleration in a direction vertical to the palm, and the other axis is arranged to detect the acceleration in a direction parallel to the palm. The hand action is the motion of the fingers, and the motion of the fingers can be represented as clenching and unclenching a fist and opening and closing fingers. Accordingly, the above arrangement can represent the gesture of a hand.

Figure 3:
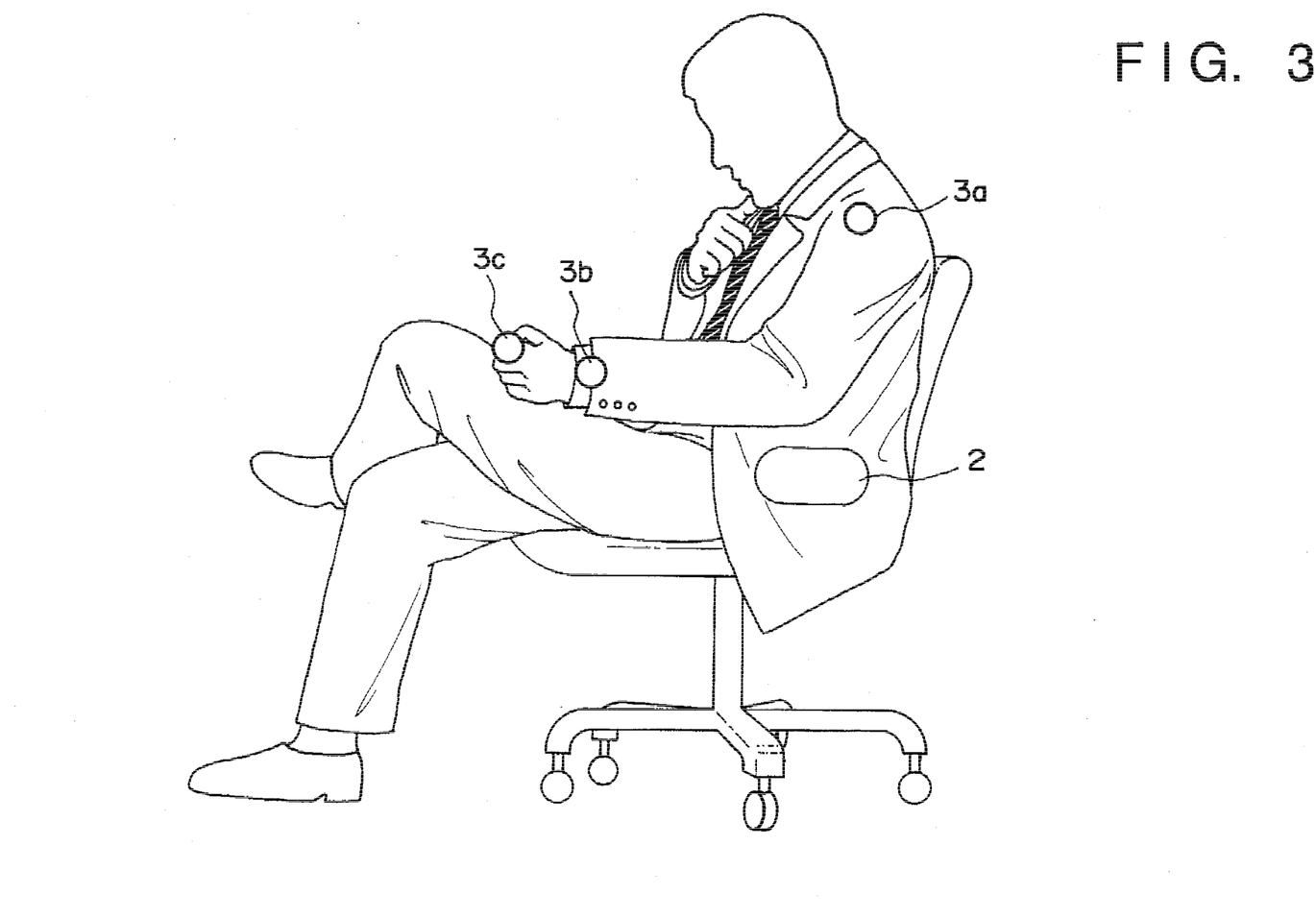
FIG. 3 is an example of another use of the gesture input apparatus of the first embodiment.

However, in consideration of general manual sign language, merely inputting hand motion is insufficient. That is, extracting and inputting the arm movement are necessary. FIG. 3 shows another application example. Note that the two-axis acceleration sensors have the same reference numerals, however, the arrangement of the sensors in FIG. 2 and that in FIG. 3 are independent of each other. The sensors are arranged at various points in accordance with gesture to be judged by combining the arrangements such as those in FIGS. 2 and 3. Preferably, an output from the two-axis acceleration sensor provided at a portion is commonly used as inputs of a plurality of reference circuits.

The two-axis acceleration sensor 3a as the reference sensor is attached to the shoulder of an user, and the other two sensors 3b and 3c are attached to the wrist and the index finger. One axis of the two-axis acceleration sensors 3 is set to detect the acceleration in a direction parallel to the front surface of the user's body, and the other axis is set to detect the acceleration in a direction vertical to the front surface direction. This arrangement can represent the gesture of the whole arm.

In any of the constructions, human gesture is accompanied with the movements of joints, however, as the movement of a joint is limited to the movement in a specified direction, detecting three-dimensional movement is not necessary. To represent the whole movement such as the movement of an arm, that of the upper half of a body and that of the whole body, the number of movements of joints to be represented increases. Accordingly, the gesture input apparatus must be combined for a plurality of detection steps, however, the detection can be easily made.

The advantageous points of the present embodiment that utilizes the acceleration sensor as motion detection means are, first, the speed-up of sampling. In this construction, a single device can obtain output corresponding to acceleration, while in a three-dimensional coordinate input device which uses sound waves, motion detection is accompanied by the delay of transmission of sound waves. Secondly, correct and precise output with respect to gesture can be obtained. "correct" means avoiding "shift from actual hand motion" that is a problem which occurs when a strain gauge is attached to the hand, by correctly following the motion of fingers or the arm. "Precise" is the fine gesture-input of the delicate motion of each finger by providing sensors for the respective fingers. For example, the difference between the motion of the index finger and that of the middle finger can be discriminated. Thirdly, down-sizing of elements attached to the user's body such as a hand and an arm can be attained. An IC-sized sensor is on the market, and the amount of electric consumption is small. The incompatible feeling from a large-sized sensor must be avoided. Fourthly, the most important point is that easy conversion of gesture into coded data of the minimum amount is possible. In the case of a three-dimensional coordinate input, the obtained data is a set of coordinate data and each changes momentarily. To represent the gesture by coordinates, minute sampling is needed. However, utilization of acceleration decreases the number of degree with respect to time by processing of differential data of coordinate data. Thus, arithmetically simple data processing can be attained. That is, a differential type sensor is preferable in consideration of detected data amount.

Figure 7:
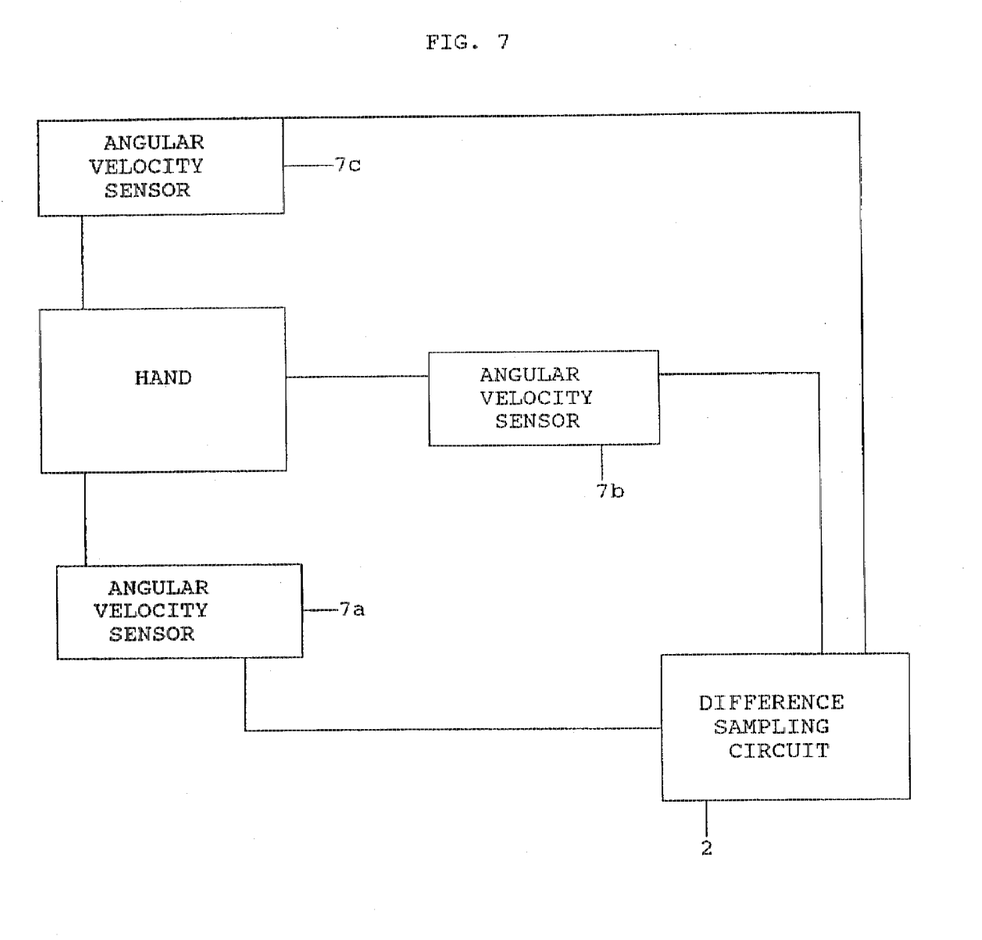
FIG. 7 is an example of a use of the gesture input apparatus employing multiaxis angular velocity detection.

From the above four advantageous points, an angular velocity sensor (gyro) having the same advantage as that of the acceleration sensor may be employed. Note that in order to detect angular velocities, the arrangement of the angular velocity sensors is somewhat different from that of the acceleration sensors. FIG. 7 shows the use of angular velocity sensors as elements 7a, 7b, and 7c in an arrangement somewhat different from that of the acceleration sensors shown in FIG. 2. Similar to FIG. 2, upon inputting the gesture of a hand, to represent actual hand motion, one of the two axes of the sensors is provided to detect a direction rotating around a direction passing through the wrist to the middle-finger tip as the central axis, while the other axis is provided to detect an angular velocity in a direction where the hand is bent inward. Upon inputting arm gesture (see FIG. 3), the arrangement is made in the same manner. Further, conversion of input gesture into coded data by the difference sampling circuit 2, i.e., the method for processing (extraction and selection) a sensor difference output value is somehow different from that in the acceleration sensor.

The above-described Examples 1 to 3 are also employed here, however, the Examples 4 and 5 are changed as follows.
Example 4: selection of an integral value among the sensor difference output values
Example 5: selection of the maximum value among sensor difference output values, or the maximum integral value among the sensor difference output values.

The twice-integral value among the sensor difference output vales is a value generated by twice-integration on the velocity, and this value has no meaning. Therefore the twice-integral value is not included in the above processing method.

Further, the advantageous point in utilizing the difference output will be described. That is, in FIG. 2, when only the hand gesture is extracted, it is not necessary to detect a direction of the hand with respect to the body or a computer (information device for gesture input), or to detect the motion of the hand with respect to the body or the computer. However, upon input, it is difficult to move only the fingers without moving the hand. That is, the difference processing is required to detect only the necessary motion. In the case of inputting the motion of fingers, a reference sensor may be attached to the hand; in the case of inputting the motion of the arm, the reference sensor may be attached onto the shoulder; and in the case of inputting the motion of the upper-half body, the reference sensor may be attached to the waist. In this manner, the above processing is suitable to detect only the minimum necessary data.

Figure 5:
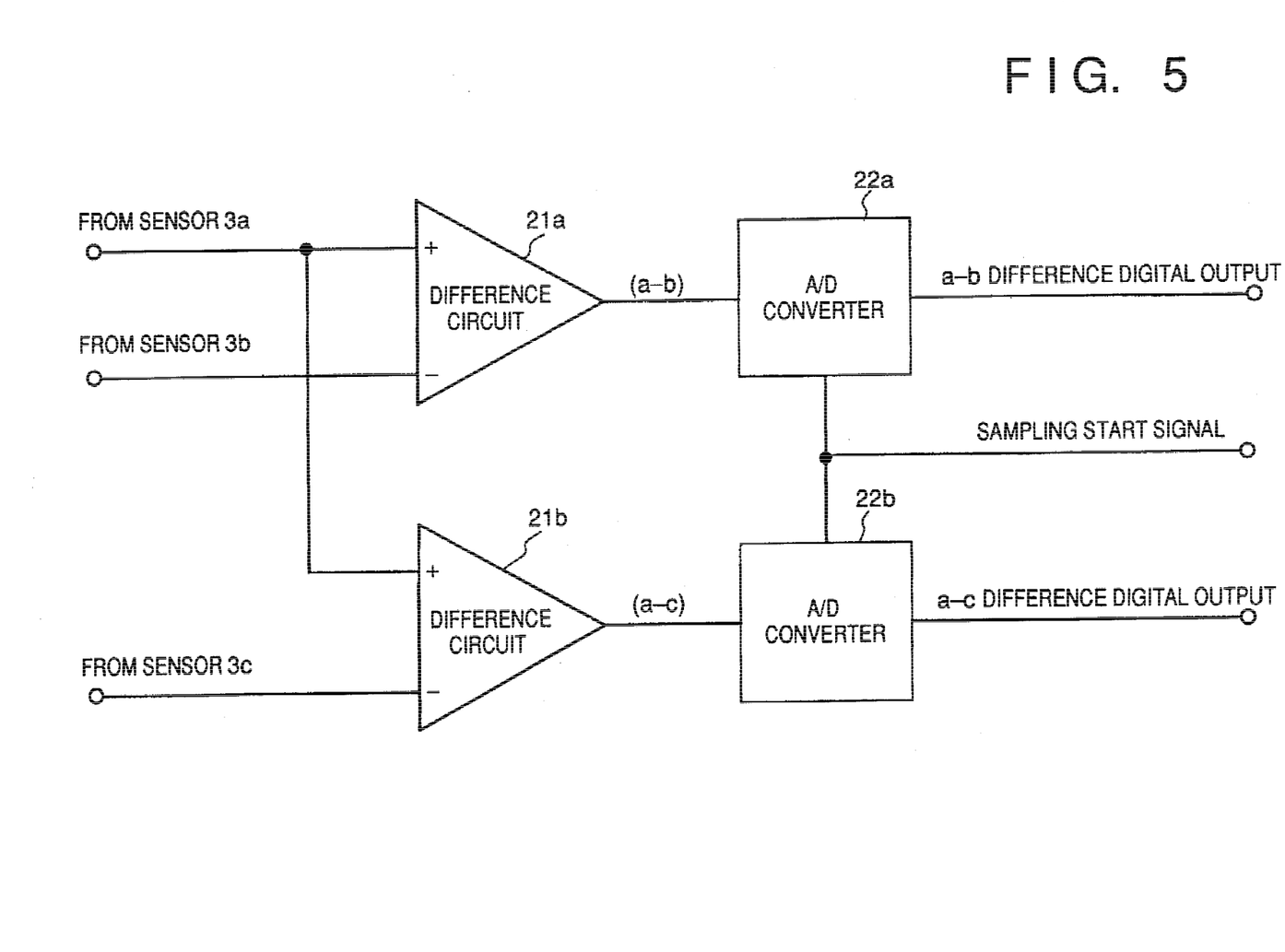
FIG. 5 is a block diagram showing the construction of a difference sampling circuit according to the second embodiment.

FIG. 5 shows the construction of the difference sampling circuit 2.

Reference numerals 21a and 21b denote difference circuits which respectively subtract the input from the negative (−) input terminal from the input from the positive (+) input terminal and output the difference; and 22a and 22b, A/D converters which respectively convert the analog data into digital data. In this example, the sensor 3a is used as the reference sensor, and the difference digital outputs of the sensors 3b and 3c (a–b difference and a–c difference) are obtained.

The arithmetic operation controller 1 notifies the timing of starting sampling. The period of sampling may be made by the A/D converters 22b and 2c by having timers, otherwise, the arithmetic operation controller 1 may provide a sampling synchronizing signal (trigger). The digital outputs (a–b difference and a–c difference) may be a data array which is continuous and half-endless/infinite from the viewpoint of time, however, in this example, the data array to be recognized is obtained from (4 bits/sampling) ×n times (see FIG. 6). If the timing of stopping the sampling is provided from the sensor side (e.g., by providing switches), the data array from the start to the end of sampling may be standardized (regularized) and it may be converted into data in another format before recognition.

Figure 6:
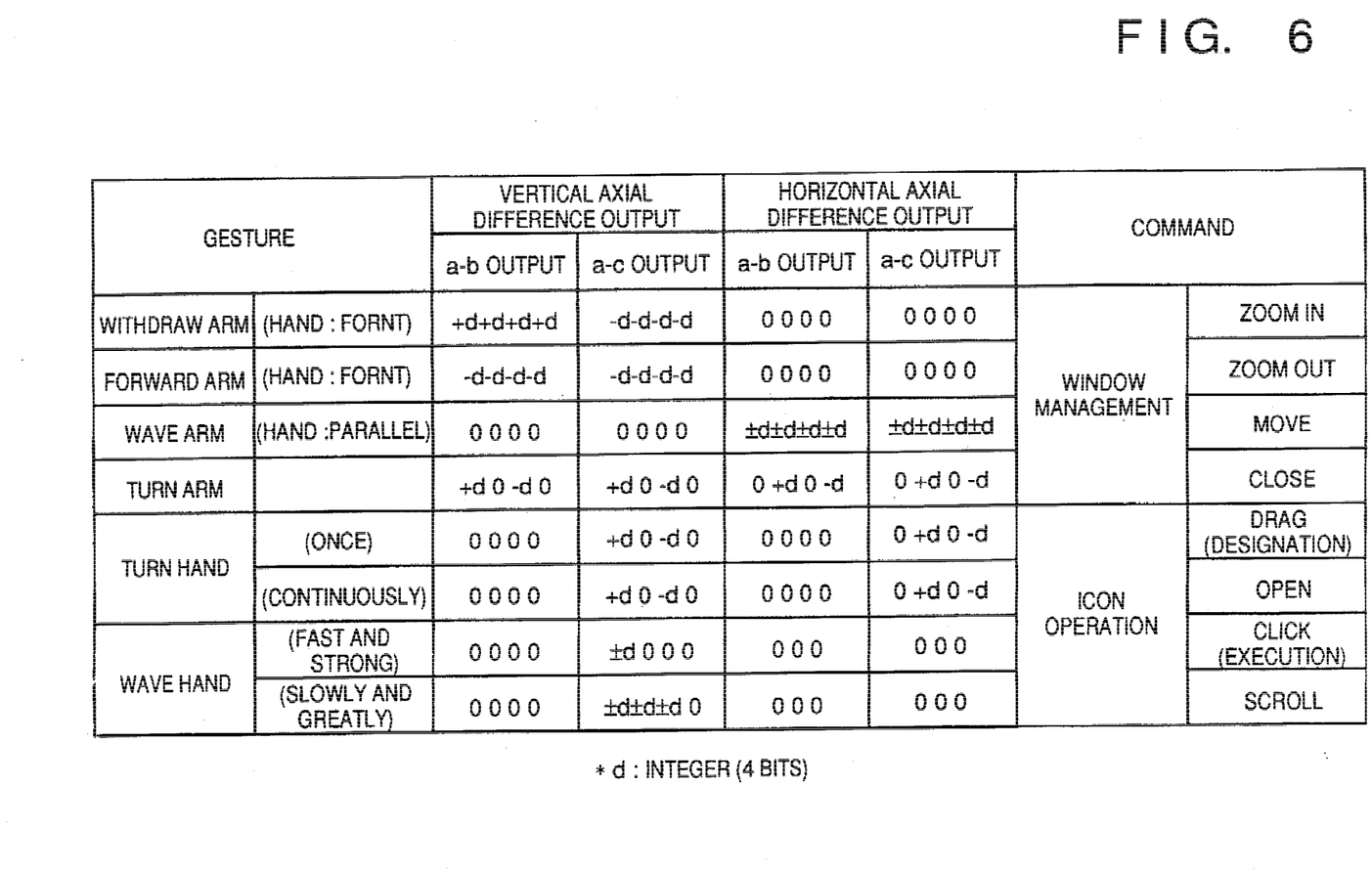
FIG. 6 is a table showing the relation among gestures stored in a gesture dictionary 4, difference output data (a–b difference and a–c difference) and judgment output (command).

FIG. 6 is an example of a table showing the relation among gesture, difference output data (a–b difference and a–c difference) and judgment output (command), stored in the gesture dictionary 4 upon gesture input in the sensor arrangement in FIG. 3.

As described above, data to be recognized is a data array in a unit of (4 bits/sampling) ×4 times. The difference data in FIG. 6 are output data corresponding to typical (feature) gestures stored in the gesture dictionary. In recognition processing, one of the stored gestures closest to the input gesture is judged as input gesture. In FIG. 3, sensors for two axes are provided. One axis is vertical to a surface on which the sensor is attached, while the other axis is parallel to the surface, as a horizontal swaying direction. Accordingly, in the sensor (3c) attached to the back of the hand, vertical-axis difference output is output in a direction vertical to the back of the hand, while horizontal-axis difference output is output in a direction passing through the thumb and the little finger. Although FIG. 6 only shows easily-recognizable gestures, i.e., gestures which generate clear difference among output data, the number of gestures can be easily increased by increasing directions in which the hand is directed, rotated (clockwise or not), swayed, etc.

Further, it is apparent that the number of gestures to be represented can be infinitely increased by increasing the number of positions where sensors are attached or by attaching another set of sensors to the other arm. In addition, though the sensor 3a is employed as the reference sensor and the difference outputs are obtained between the sensors 3b and 3c outputs, the difference between the outputs from the sensors 3a and 3b and the difference between the outputs from the sensors 3b and 3c may be obtained.

[Second Embodiment]

Figure 4:
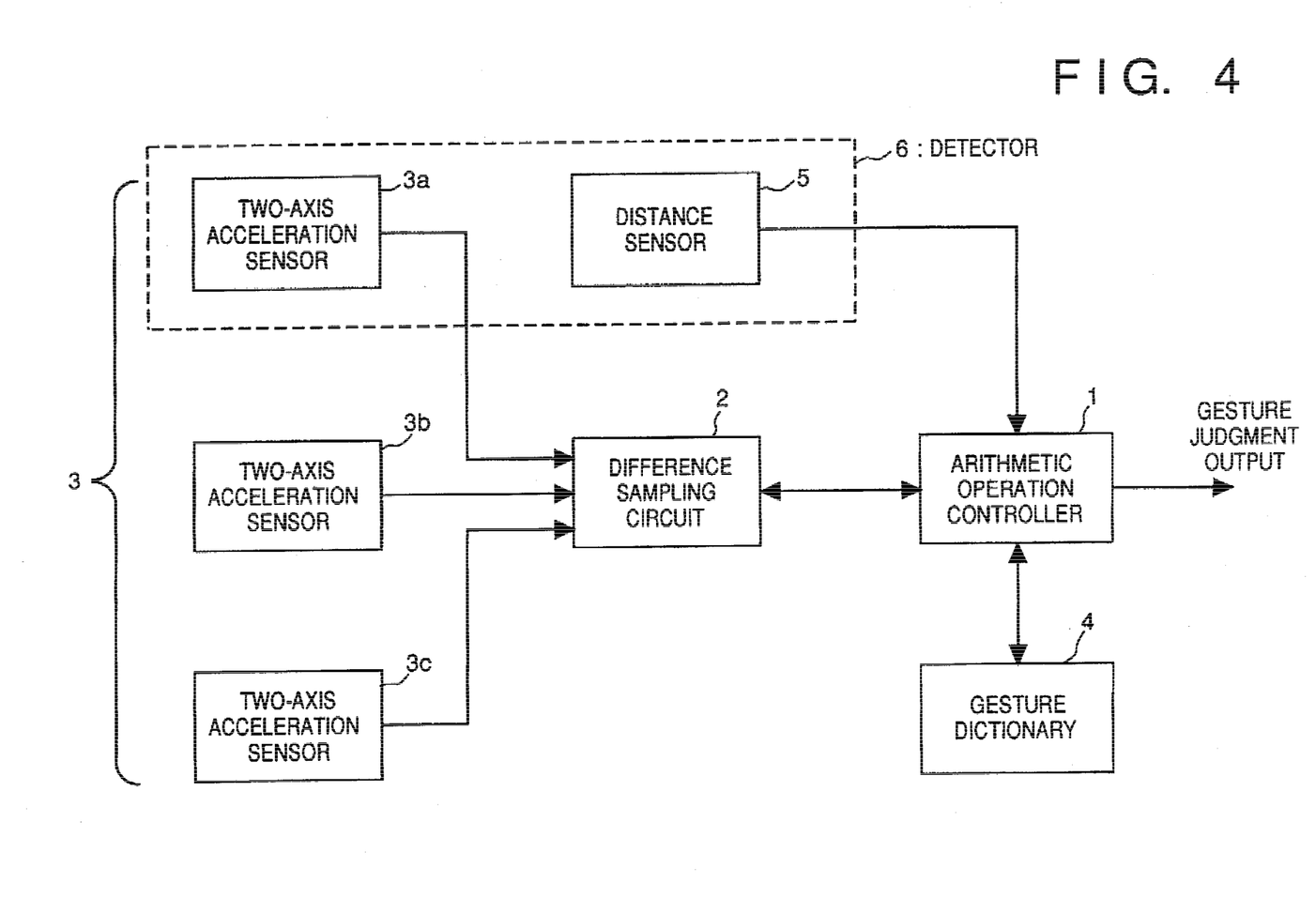
FIG. 4 is a block diagram showing the construction of a gesture input apparatus according to a second embodiment of the present invention.

A gesture input apparatus according to a second embodiment of the present invention will be described with reference to FIG. 4.

As described above, when hand gesture is inputted, the motion of the fingers is mainly inputted. However, if a movement that a hand approaching a computer and a movement that the hand is moving away from the computer are inputted, the number of gesture types which can be inputted will be increased. For this purpose, in FIG. 4, a distance sensor 5 which measures the distance between the computer and a detector 6 is provided. The distance sensor 5 may use an ultrasonic-wave sensor or a magnetic sensor with relatively low precision, and it may be provided at the same position as that of the two-axis acceleration sensor 3a as the reference sensor. The conventional three-dimensional coordinate input device has been required to input a three-dimensional position. however, considering the purpose of gesture input, only one-dimensional measurement data is sufficient.

Note that in the present embodiment, two-axis acceleration sensors or two-axis angular velocity sensors are employed since the movement of an arm and the like can be fully detected from accelerations about two axes or velocities about two axes. For analyzing further detailed movement, or in a case where motion detection is difficult by two axes, sensors of more axes can be employed.

Further, the present invention can be applied to a system constituted by a plurality of devices, or to an apparatus comprising a single device. Furthermore, the invention is applicable also to a case where the object of the invention is attained by supplying a program to a system or apparatus.

As described above, the present invention provides a gesture input method and apparatus which enables correct and high-precision gesture input, based on difference output data from multiaxis acceleration sensors or multiaxis angular velocity sensors. Further, the present invention provides a gesture input method and apparatus which attains downsizing of the apparatus, and which enables high-speed operation due to the small amount of gesture input data.

As many apparently widely different embodiments of the present invention can be made without departing from the spirit and scope thereof, it is to be understood that the invention is not limited to the specific embodiments thereof except as defined in the appended claims.

What is claimed is:

1. A gesture input apparatus comprising:

a plurality of multiaxis acceleration detection means, each having a plurality of acceleration detecting means wherein the acceleration detecting means of each multiaxis detection means are on respective nearly orthogonal axes of the multiaxis acceleration detection means, respectively for detecting multiaxis accelerations of the multiaxis acceleration detection means;

difference value output means for outputting for every one of the nearly orthogonal axes a value of a difference between one of the multiaxis accelerations detected by one of the multiaxis acceleration detection means, as a reference value, and another of the multiaxis accelerations detected by another one of the multiaxis acceleration detection means; and gesture recognition means for recognizing a gesture responsive to data representing a set of difference values at a point or points of time outputted by the difference value output means, wherein said plurality of multiaxis acceleration detection means function independently from each other, and wherein said gesture recognition means includes gesture dictionary means for prestoring samples of difference values, and said gesture recognition means performs recognition by comparing an output value from said difference value output means with a difference value sample in said gesture dictionary means.

2. The gesture input apparatus according to claim 1, wherein a said plurality of multiaxis acceleration detection means are attached on a movable object in such a manner that directions of corresponding axes among the nearly orthogonal axes of said plurality of multiaxis acceleration detection means are nearly the same.

3. The gesture input apparatus according to claim 1, wherein each of said plurality of multiaxis acceleration detection means has two axes.

4. The gesture input apparatus according to claim 1, further comprising measurement means for detecting a relative distance between a fixed member and said gesture input apparatus, by using sound waves or light.

5. A gesture input apparatus comprising:

a plurality of multiaxis angular velocity detection means, each having a plurality of angular velocity detecting means wherein the angular velocity detecting means of each multiaxis angular velocity detection means are on respective nearly orthogonal axes of the multiaxis angular velocity detection means, respectively for detecting multiaxis angular velocities of the multiaxis angular velocity detection means;

difference value output means for outputting for every one of the nearly orthogonal axes a value of a difference between one of the multiaxis angular velocities detected by one of the multiaxis angular velocity detection means, as a reference value, and another one of the multiaxis angular velocities detected by another one of the multiaxis angular velocity detection means; and gesture recognition means for recognizing a gesture responsive to data representing a set of difference values at a point or points of time outputted by the difference value output means, wherein said plurality of multiaxis angular velocity detection means function independently from each other.

6. The gesture input apparatus according to claim 5, wherein said plurality of multiaxis angular velocity detection means are attached on a movable object in such a manner that directions of corresponding axes among said nearly orthogonal axes of said plurality of multiaxis angular velocity detection means are nearly the same.

7. The gesture input apparatus according to claim 5, wherein each of said plurality of multiaxis angular velocity detection means has two axes.

8. The gesture input apparatus according to claim 5, wherein said gesture recognition means includes gesture dictionary means for pre-storing sample values of feature difference values, and said gesture recognition means performs recognition by comparing an output value from said difference value output means with a value stored in said gesture dictionary means.

9. The gesture input apparatus according to claim 5, further comprising measurement means for detecting a relative distance between a fixed member and said gesture input apparatus, by using sound waves or light.

* * * * *

UNITED STATES PATENT AND TRADEMARK OFFICE
CERTIFICATE OF CORRECTION

PATENT NO. : 5,714,698

DATED : February 3, 1998

INVENTOR(S) : MASAKI TOKIOKA, ET AL.

It is certified that error appears in the above-identified patent and that said Letters Patent is hereby corrected as shown below:

On the title page,

AT [56] REFERENCES CITED

FOREIGN PATENT DOCUMENTS

"Germany" should read --Ger. Dem. Rep.--.

COLUMN 1

Line 36, "for" should read --before--.

COLUMN 2

Line 63, "and" should be deleted; and
Line 67, "(command)." should read --(command); and--.

COLUMN 4

Line 32, "an" should read --a--.

COLUMN 5

Line 1, "incompat-" should read --uncomfortable--; and
Line 2, "ible" should be deleted.

UNITED STATES PATENT AND TRADEMARK OFFICE
CERTIFICATE OF CORRECTION

PATENT NO. : 5,714,698

DATED : February 3, 1998

INVENTOR(S) : MASAKI TOKIOKA, ET AL.

Page 2 of 2

It is certified that error appears in the above-identified patent and that said Letters Patent is hereby corrected as shown below:

<u>COLUMN 8</u>

Line 2, "a" should be deleted.

Signed and Sealed this

Eighteenth Day of August, 1998

Attest:

BRUCE LEHMAN

*Attesting Officer*    *Commissioner of Patents and Trademarks*